US005603035A

United States Patent [19]

Erramoun et al.

[11] Patent Number: 5,603,035
[45] Date of Patent: Feb. 11, 1997

[54] PROGRAMMABLE INTERRUPT CONTROLLER, INTERRUPT SYSTEM AND INTERRUPT CONTROL PROCESS

[75] Inventors: Dominique Erramoun, Mougins; Jean-Francois Karcher, Valbonne, both of France

[73] Assignee: Telemecanique, Rueil Malmaison, France

[21] Appl. No.: 250,868

[22] Filed: May 27, 1994

Related U.S. Application Data

[63] Continuation of Ser. No. 933,712, Aug. 24, 1992, abandoned.

[30] Foreign Application Priority Data

Aug. 22, 1991 [FR] France ................................ 91 10517

[51] Int. Cl.⁶ .......................... G06F 9/46; G06F 13/24
[52] U.S. Cl. .................................... 395/733; 395/737
[58] Field of Search ................................ 395/733, 735, 395/736, 737, 739, 742, 868

[56] References Cited

U.S. PATENT DOCUMENTS

| | | | |
|---|---|---|---|
| 3,881,174 | 4/1975 | Barnich | 395/725 |
| 4,275,458 | 6/1981 | Khera | 395/725 |
| 4,296,470 | 10/1981 | Fairchild et al. | 395/725 |
| 4,418,385 | 11/1983 | Bourrez | 395/725 |
| 4,628,449 | 12/1986 | Zardiackas | 395/725 |
| 4,630,041 | 12/1986 | Casamatta et al. | 395/725 |
| 4,644,465 | 2/1987 | Imamura | 395/725 |
| 4,755,938 | 7/1988 | Takahashi et al. | 395/725 |
| 4,761,732 | 8/1988 | Eldumiati et al. | 395/725 |
| 4,788,639 | 11/1988 | Tamaru | 395/725 |
| 4,802,087 | 6/1989 | Keeley et al. | 395/725 |
| 5,083,261 | 1/1992 | Wilkie | 395/725 |
| 5,101,497 | 3/1992 | Culley et al. | 395/725 |
| 5,109,513 | 4/1992 | Otsuka | 395/725 |
| 5,125,093 | 6/1992 | McFarland | 395/725 |
| 5,134,706 | 7/1992 | Cushing et al. | 395/725 |
| 5,146,597 | 9/1992 | Williams | 395/725 |
| 5,155,853 | 10/1992 | Mitsuhira et al. | 395/725 |
| 5,193,195 | 3/1993 | Miyazaki et al. | 395/725 |
| 5,212,796 | 5/1993 | Allison | 395/725 |
| 5,261,107 | 11/1993 | Klim et al. | 395/739 |
| 5,283,904 | 2/1994 | Carson et al. | 395/725 |
| 5,428,799 | 6/1995 | Woods et al. | 395/725 |

OTHER PUBLICATIONS

IBM Technical Disclosure Bulletin, Mar. 1989, vol. 31, No. 10, pp. 437–444: "Integrated Hardware/Software Interrupt Controller".

Electronic Design International, Jul. 12, No. 13, "Push A 32–Bit Micro Channel Bus to the Limit".

Components Handbook, 1984, pp. 120–137, Intel Corporation, 8259A "Programmable Interrupt Controller".

Primary Examiner—Ayaz R. Sheikh
Attorney, Agent, or Firm—Oblon, Spivak, McClelland, Maier & Neustadt, P.C.

[57] ABSTRACT

A programmable interrupt controller connected to a microprocessor has a register for storing a prevailing vector which is the highest priority vector in service in the microprocessor system. When the microprocessor is executing an interrupt routine, if the programmable interrupt controller or a second programmable interrupt controller connected to the microprocessor receives an interrupt request higher in priority than the executing interrupt, the microprocessor writes the higher priority interrupt vector into the register for storing the prevailing vector of all connected interrupt controllers. Once the higher priority interrupt routine has finished executing, the microprocessor then writes the lower priority previously executing interrupt vector into the register of the prevailing vector of all interrupt controllers and the previously executing interrupt routine continues executing in the microprocessor. The structure of the interrupt controller allows a plurality of interrupt controllers to be connected to the microprocessor without having one of the controllers act as a master and the others as slaves. The order of the priorities of the interrupts for each controller can be programmed using software.

36 Claims, 3 Drawing Sheets

PROGRAMMABLE INTERRUPT CONTROLLER, INTERRUPT SYSTEM AND INTERRUPT CONTROL PROCESS

This application is a continuation of application Ser. No. 07/933,712, filed on Aug. 24, 1992, now abandoned.

BACKGROUND OF THE INVENTION

1. Field of the Invention

This invention relates, on the one hand, to a programmable interrupt controller intended to receive interrupt requests from a plurality of interrupt sources (peripheral elements: inputs-outputs, coprocessors, etc.) and, after hierarchization, to communicate these interrupt requests to the microprocessor via the data bus and, on the other hand, to a microprocessing interrupt system using this controller and to an interrupt control process.

2. Discussion of the Background

In a microprocessing system such as the one represented in FIG. 1, the peripheral elements perform tasks independently of the microprocessor, designated µP 100, and must be able to communicate with this microprocessor in a random manner over time, i.e., according to asynchronous functioning. The peripheral element transmits an interrupt request signal that is processed by an interrupt controller, designated by "PIC" 102. The latter is a circuit that generally has eight hierarchized interrupt levels. When one or more "interrupt request" inputs from the controller is (are) activated, the controller 102 determines which request has the highest priority and consequently provides to the microprocessor 100 a specific interrupt signal of the selected interrupt request.

Interrupt controllers of the 8259 series that the INTEL Corporation company produces are described in the publication "Microprocessor and Peripheral Handbook" of INTEL, pages 3-171 to 3-195 of October 1988.

FIG. 2 is a block diagram of interrupt controller 8259A. European patents EP—0 358 330 and EP 0 426 331 describe interrupt controllers of the type of the 8259A. This 8259A interrupt controller receives on its inputs IR0 to IR7 up to eight hierarchized interrupt requests. As soon as an interrupt request appears on one of inputs IR0 to IR7, the interrupt controller stores it and addresses, by its output INT, an interrupt request to the microprocessor. The microprocessor ends the instruction in progress and generates two pulses on input/INTA of the controller. The latter then sends, on the data bus, a specific interrupt code.

The controller comprises a register of the interrupt requests that receives the eight "interrupt requests" inputs (1 bit per input IRi). This register is called "INTERRUPT REQUEST REGISTER" and is designated by IRR 100. A register of the in-service interrupts has stored the request being serviced or executed or the requests when the request in progress has been interrupted by a higher priority request. This register is called "IN-SERVICE REGISTER" and is designated by ISR 112. A functional block called "PRIORITY RESOLVER" 114 determines the priorities stored in the IRR register and sends a specific code of the priority selected into register ISR. An interrupt mask register makes it possible to inhibit or enable individually each interrupt level. It is designated by IMR ("INTERRUPT MASK REGISTER") 116.

Since bit IRRi is active, bit ISRi is activated by the "PRIORITY RESOLVER" 114 functional block on receipt of a pulse/INTA, if level i is of higher priority than the other active levels in register IRR and in register ISR and if IMRi=0. It is deactivated by an end-of-interrupt command in the interrupt routine (except Automatic End of Interrupt Mode).

An active ISR bit means that the microprocessor has acknowledged the request by a sequence INTA. Either the microprocessor is in the process of executing the associated interrupt routine, or it has begun to do it but it has been rerouted to a higher priority interrupt routine. Several bits can therefore be active simultaneously.

The block called "PRIORITY RESOLVER" 114 has an additional piece of information available, which is the level with which the lowest priority is associated. By default, this level is IR7 but it can be modified by the rotating priority mode ("Specific Rotation or Automatic Rotation"). The priorities associated with the other levels result from it by simple rotation.

Several INTEL 8259A controllers can be associated to increase the number of interrupt levels. One of the controllers becomes the master controller, the others being the slave controllers. The master controller that is connected to the microprocessor is tasked with hierarchizing the interrupts arriving at the various controllers. This solution lacks flexibility.

European patent EP—0 426 081 describes a programmable interrupt controller that can be associated with other identical controllers in the master—slave type relationship.

SUMMARY OF THE INVENTION

Accordingly, one object of this invention is to provide a controller having a plurality of interrupt inputs (m inputs) that can be associated with a plurality of identical controllers (n controllers) so that the interrupt inputs (m×n) are programmable. The order of the relative priorities of the interrupt inputs of each circuit can be programmed in any way, making it possible to freely determine the hierarchy of the interrupts on all of the controllers of the interrupt system.

The interrupt controller according to the invention comprises:
- a register for storing the interrupt requests receiving, at a plurality of inputs, the "interrupt request" signals coming from the interrupt sources;
- a mask storage register to inhibit or enable individually, by programming, each interrupt level;

and is characterized by the fact that it comprises:
- registers for storing a plurality of bytes or vectors each corresponding to an interrupt source;
- a register of the prevailing vector for storing the higher priority byte or vector in service;
- comparator for systematically comparing each of the active and non-masked vectors with the vector stored in the register for storing the prevailing vector and for loading the prevailing vector register with the higher priority vector of the two;
- a transmitter for transmitting in contention, on the data bus, the higher priority or prevailing vector.

According to a characteristic of the invention, the transmitter for transmitting in contention, on the data bus, of the higher priority vector comprises a send-receive circuit and a contention logic circuit.

According to another characteristic of the invention, the transmitter for transmission in contention comprises means for validating the transmission, to the data bus, of a bit of the prevailing vector only if there is equivalence between the immediately higher-weight bit of said prevailing vector and the bit of the same weight of input data (DIN).

According to another characteristic, the transmitter for transmission in contention comprises means for validating the transmission of a bit of the prevailing vector to the data bus if the bit is in the dominant state and for not validating the transmission if this bit is in the recessive state.

According to another characteristic, the interrupt controller is characterized by the fact that it comprises a sequencer for selecting in turn one of the vectors stored in the vector storage register as well as the interrupt request and the corresponding mask so that the comparator compares, if the interrupt request is active and the mask inactive, the selected vector with the prevailing vector and control the loading of the means for storing the priority or prevailing vector with the higher priority vector.

According to a characteristic, the controller comprises a register storing the state of the sequencer associated with the prevailing vector, the loading of this register being controlled by the control logic unit.

According to the invention, the method operates by:

receiving the interrupt requests from a plurality of interrupt sources and in storing these interrupt requests, inhibiting or enabling individually each interrupt level; and it is characterized by the fact that it comprises the steps of:

storing a plurality of bytes or vectors each corresponding to an interrupt source, storing the higher priority byte or vector in service, comparing systematically each of the active and non-masked vectors with the stored vector and storing the higher priority vector of the two or prevailing vector, transmitting in contention, on the data bus, the higher priority vector or prevailing vector.

According to the invention, the interrupt control process consists in validating the transmission, to the data bus, of a bit of the prevailing vector if there is equivalence between the immediately higher-weight bit of said prevailing vector and the bit of the same weight of the data at the input.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views wherein.

DESCRIPTION OF THE PREFERRED EMBODIMENTS

Figure 1:
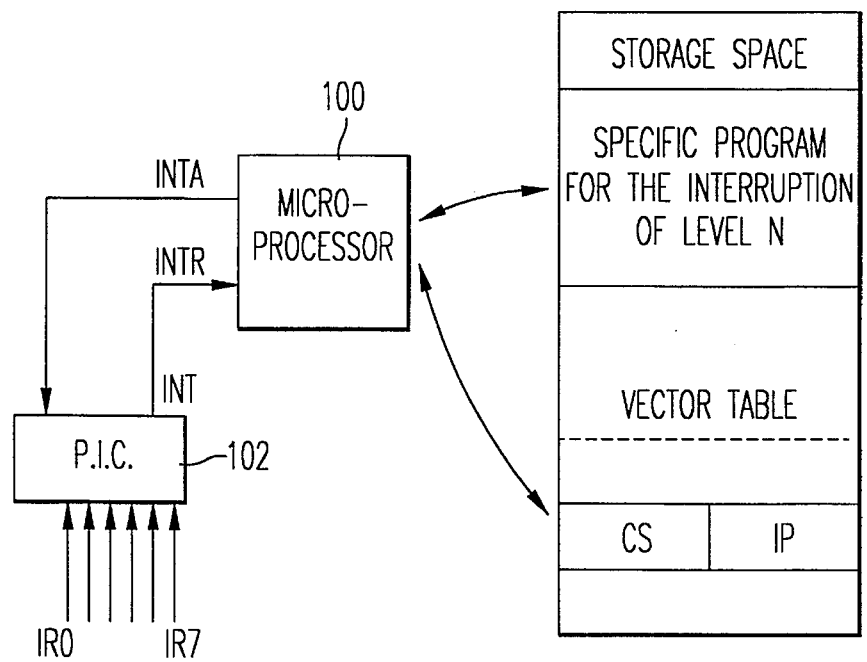
FIG. 1 is a simplified diagram of an interrupt system known in the art.
Figure 2:
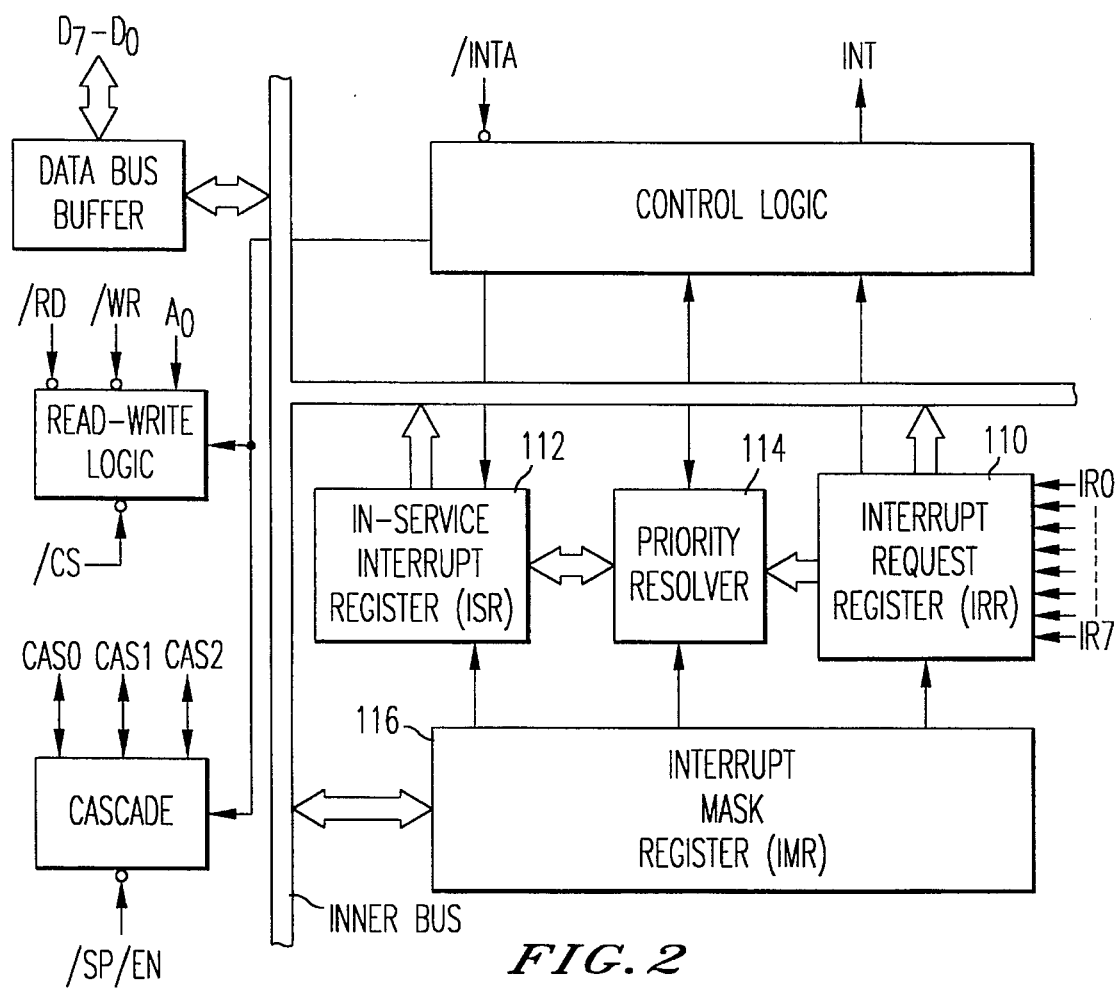
FIG. 2 is a functional diagram of the known programmable interrupt controller.
Figure 3:
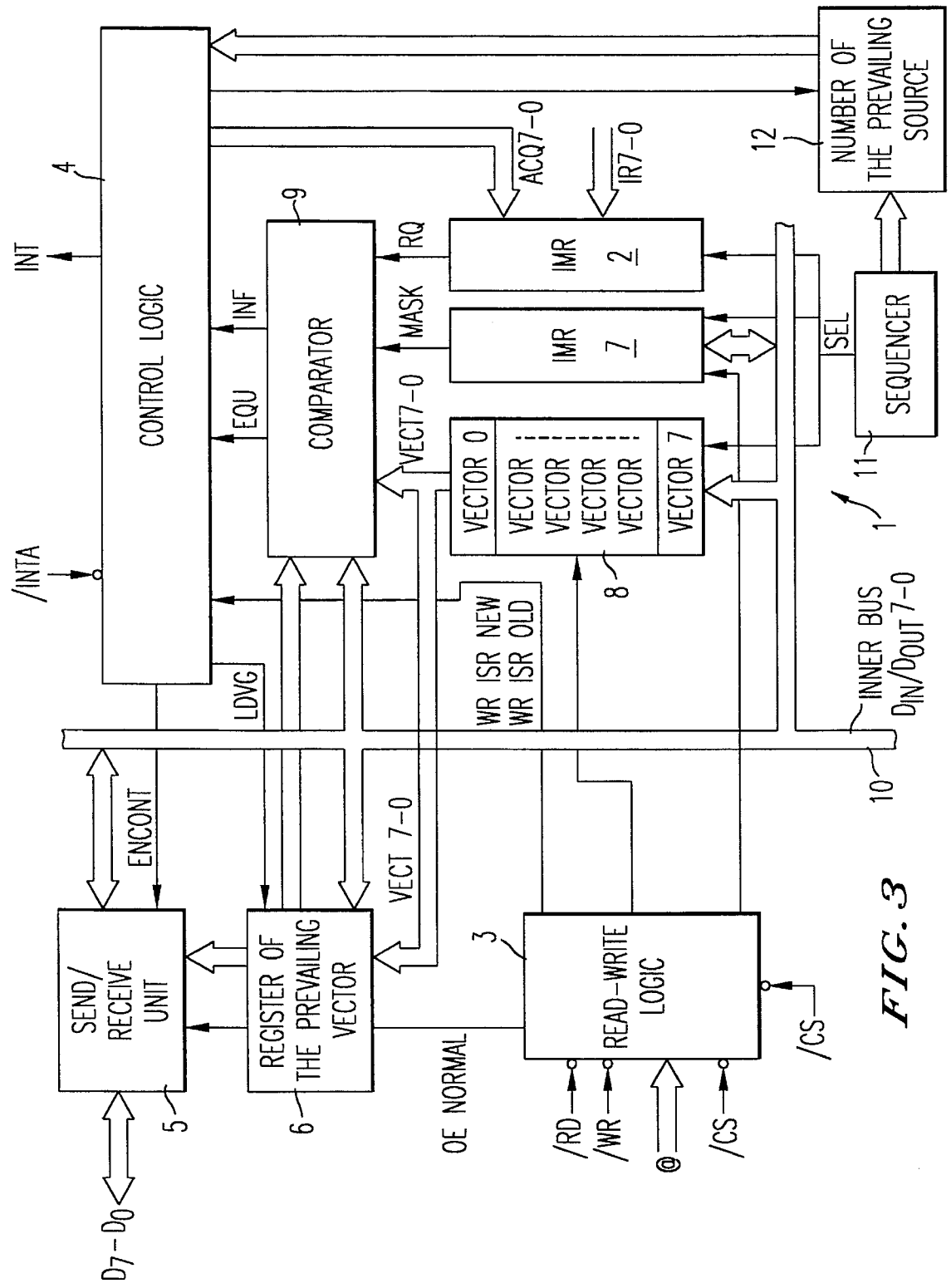
FIG. 3 is a functional diagram of the programmable interrupt controller according to the invention.

Referring now to the drawings, wherein like reference numerals designate identical or corresponding parts throughout the several views, and more particularly to FIG. 3 thereof, reference 1 designates the interrupt controller according to the invention. This interrupt controller 1 assures the interface between a microprocessor, not shown, and a plurality of peripheral input-output elements or coprocessors, which constitute independent interrupt sources, i.e., that can appear simultaneously.

The register comprises a register 2 called interrupt request register, a register 7 called interrupt mask register, a read-write logic unit 3, a control logic unit 4, a send/receive unit 5 of the data bus, a register 6 called register of the prevailing vector, a unit 8 of the registers of the vectors, a comparator 9, a sequencer 11, a "Number of the prevailing source" register 12.

The "interrupt request" signals coming from sources are received on "interrupt request" lines IR0 to IR7.

Read-write logic unit 3, which receives signals /RD, /WR, @ by pins connected to the processor, allows communication between the interrupt controller and the processor via bidirectional data bus $D_0$–$D_7$. The "/" placed next to the signal signifies that the command will be active at level 0 and inactive at level 1. Write line /WR, when it is activated, directs the controller to accept data from the processor. Read line /RD, when it is activated, directs the processor to obtain data from the controller. Address line @ acts in conjunction with /RD and /WR. Signal line /CS serves to activate or inhibit the entire controller. This unit 3 generates the read and write commands of registers 7 and 8 that are accessible to the microprocessor. It generates the command from the output buffer of the data during a register reading.

Line INT serves to send an "interrupt request" signal to the microprocessor. Line /INTA receives the "interrupt authorization" signal transmitted by the microprocessor on its pin INTA of the same name in response to signal INT.

Control logic unit 4 is a logic circuit that controls the transmission of interrupt requests to the microprocessor via interrupt line INT and that receives the "interrupt authorization" signals from the microprocessor via interrupt authorization line /INTA. Furthermore, this unit assures the acknowledgement of register 2 (signals ACQi) and validates the transmission in contention of the prevailing vector by unit 5 (signal ENCONT). It controls the loading of the prevailing vector in register 6 (signal LDVG) and the loading of the number of the prevailing source in register 12.

The interrupt requests coming from the various interrupt sources are applied to "interrupt request" lines IR0 to IR7 which are received on register 2 of the interrupt requests. This register 2 of the interrupt requests of the "Set-Reset" type stores the identity of any interrupt line IR0–IR7. The interrupt requests are activated by IR7-0 and are deactivated by ACQ7-0. This register has an output multiplexing function to select one of the 8 bits (RQ).

Register 7 with 8 bits (one bit per level), called interrupt mask register, serves to specify whether this level is masked (i.e., inhibited) or not. In other words, a bit at 1 indicates that the corresponding line is not to be considered. This register 7 storing the mask has an output multiplexing function to select one of the 8 bits (MASK).

A byte (of 8 bits), designated as an interrupt vector, is associated with each interrupt source. Each of the sources is associated with this vector which defines the priority of this source in relation to the other sources of the same controller but also in relation to all the other sources of the other controllers. Therefore, there is no overall hierarchy of the interrupts of one controller relative to that of another controller.

These vectors can be written in unit 8 of the registers of the vectors via the data bus. This unit 8 of the registers of the vectors, which stores the 8 interrupt vectors, has an output multiplexing function to select one of the 8 vectors (VECT 7-0).

The interrupt vector serves both as pointer in the table of the addresses of interrupt routines (Interrupt Table) and as priority of the interrupt relative to the other sources. This vector value has no a priori connection with the level number of the interrupt. The association of vector-level and number is a software choice made on configuration of the system. Vector value 00H corresponds to the highest priority.

A comparator unit 9 is connected to request register 2, and to interrupt mask register 7. It is also connected to "prevailing vector" register 6 and to unit 8 of the registers of vectors.

The controller comprises a register 6 with 8 bits designated register of the "prevailing vector." The controller updates this register of the "prevailing vector," which stores the higher priority vector of 8 bits between, on the one hand, the vectors of the active and non-masked interrupt sources and, on the other hand, vector ISR of the interrupt processed by the microprocessor. Register 6 of the prevailing vector has an input multiplexing function for two types of loading (VECT 7-0 or DIN 7-0).

Sequencer unit 11 selects, in turn, one of the eight vectors of register 8, as well as the interrupt request and the corresponding mask, respectively in registers 2 and 7 (commands SEL). If the interrupt request is active and the mask inactive, comparator unit 9 compares this vector selected by the sequencer (designated VECT 7-0) with the prevailing vector (designated VECTG 7-0) stored in register 6 to determine the higher priority. Comparator unit 9 sends a signal INF to unit 4 if the selected vector VECTi is higher priority than the prevailing vector. Unit 4 then controls, by signal LDVG sent to register 6, the loading of the prevailing vector in register 6 by new vector VECTi, if the latter is higher priority.

The interface between the controller and the data bus is assured by send-receive unit 5. This unit 5 comprises a send-receive circuit represented diagrammatically in FIG. 4 and a so-called "contention logic" circuit represented diagrammatically in FIG. 5.

Figure 4:
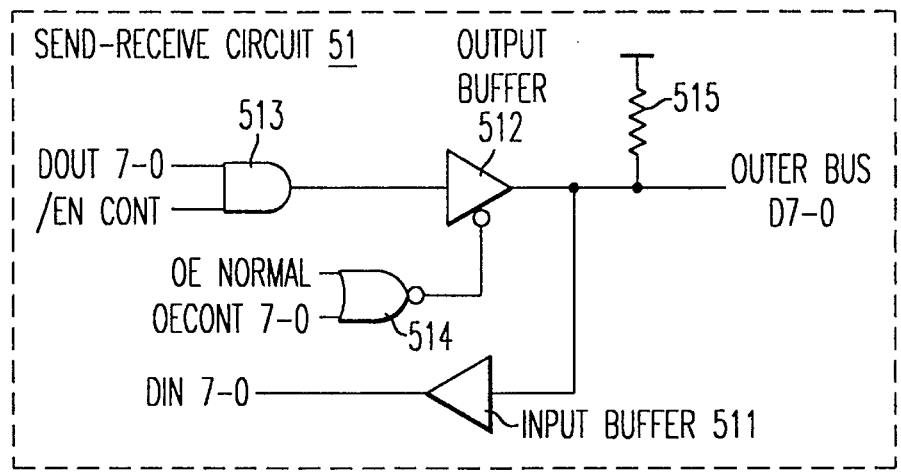
FIG. 4 is a diagram of a send-receive circuit of the controller according to the invention.

FIG. 4 illustrates by way of example the send-receive circuit, marked 51, assuring the connection with data bus D7-0. This circuit comprises an input buffer 511 assuring the reception of the data from the outer bus to the inner bus (DIN7-0) and an output buffer making possible the transmission of the data to outer data bus D7-0. This output buffer 512 makes possible the transmission in normal mode (normal OE buffer command) and the transmission in contention of the prevailing vector when input ENCONT of AND gate 513 is activated by unit 4.

Figure 5:
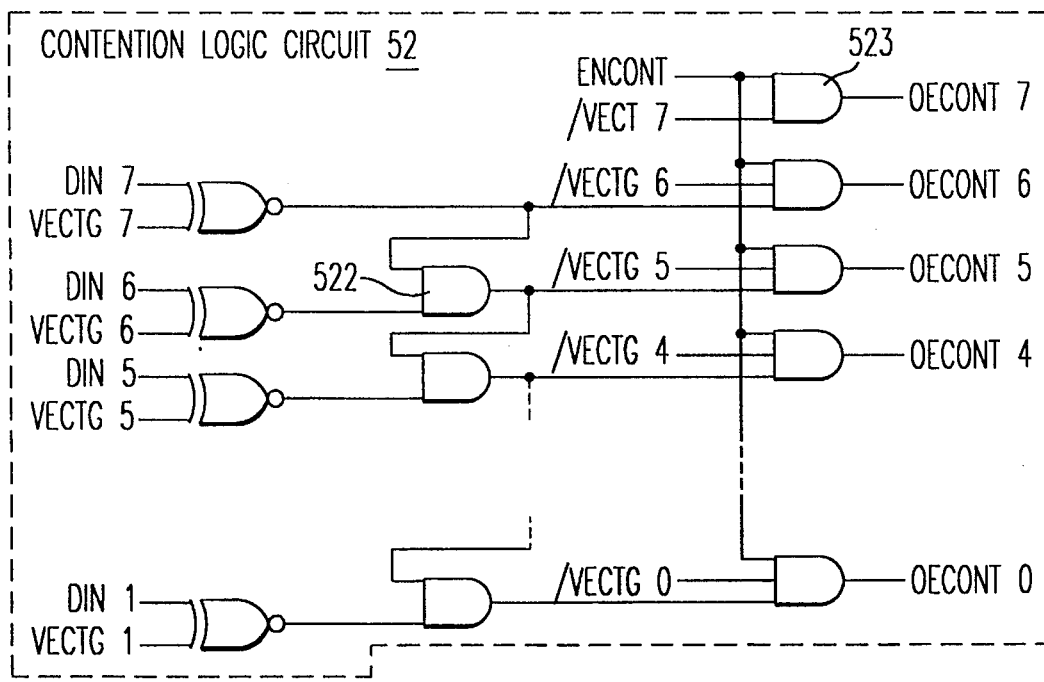
FIG. 5 is a diagram of the contention logic circuit of the controller according to the invention.

FIG. 5 illustrates by way of example the contention logic circuit marked 52. This circuit comprises a plurality of equivalence comparators 521 (gates NXOR) that each receive a bit 1 to 7 of prevailing vector VECTG, at the same time as the corresponding bit present on bus DIN7-0. The output of each comparator 521 is applied to an input of an AND gate 522 whose other input is connected to the output of the AND gate corresponding to the immediately higher bit. The outputs of gates 522 are applied to AND gates 523 that receive furthermore signal ENCONT for validation of the transmission in contention and signals/VECT 7-0. Output signals OECONT of these gates 523 are admitted on gates 514 associated with output buffer 512.

Register 6 is loaded on a writing of ISR-NEW of the microprocessor and on a writing of ISR OLD if the controller has not transmitted an interrupt.

"Prevailing vector" register 6 is accessible to the microprocessor by two different addresses, namely:

IRS-NEW: the microprocessor performs this writing at the beginning of the interrupt routine with the result of the contention, i.e., the vector prevailing among all the components. When it receives the command WR ISR NEW, the controller loads its prevailing vector register 6 with the priority (vector) that won the contention. This prevailing vector will therefore eventually be overwritten by the vector of a higher priority interrupt. This command is translated in the controller that won the contention by the acknowledgement of the source associated with the prevailing vector, (signals ACQi generated by unit 5), IRS-OLD: the microprocessor performs this writing at the end of the interrupt routine with vector ISR of the preceding routine that had been interrupted.

Register 6 therefore contains either ISR, or a vector that is higher priority than ISR.

The loading in register 6 of the vector corresponding to one of sources IR0–IR7 causes the activation of line INT connected to the microprocessor.

On receipt of the signal INTA transmitted by the microprocessor, unit 4 of the controller provides a signal ENCONT that validates the transmission by send-receive unit 5 of the vector in contention on data bus D7-0.

When, at the beginning of an interrupt routine, the microprocessor writes ISR-NEW, the controller compares this vector with the one that it has transmitted. Comparator 9 tests the equivalence between the data of inner bus DIN7-0 and prevailing vector VECTG7-0. If these vectors are equal, comparator 9 sends signal EQU to unit 4. The latter acknowledges corresponding source IR0–IR7 by lines ACQ7-0. To do this, the loading of the prevailing vector must be inhibited from the beginning of the signal INTA until the writing of ISR-NEW. Register 6 has thus stored the vector transmitted in contention.

To allow the acknowledgement of source IR0–IR7 associated with the prevailing vector, "number of the prevailing source" register 12 stores the state of sequencer 11 associated with the prevailing vector. Its loading is controlled by unit 4.

Figure 6:
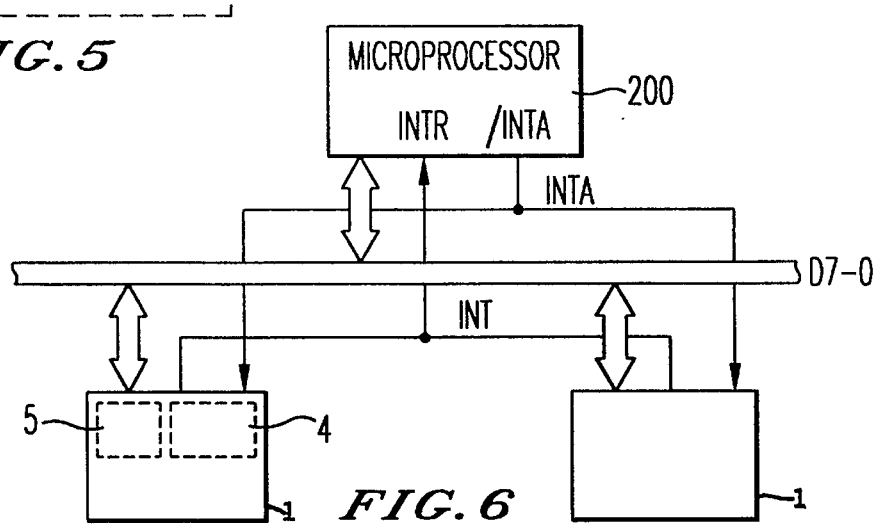
FIG. 6 is a diagram of an interrupt system comprising several programmable interrupt controllers according to the invention.

FIG. 6 shows an interrupt system with several controllers 1. Each of these controllers is connected by its interrupt request input INT to input INTR of the microprocessor 200 and by its pin/INTA to pin INTA of the microprocessor 200. All these controllers 1 receiving signal/INTA and having activated their output INT (active signal ENCONT) transmit their prevailing vector simultaneously in contention on data bus 10. This transmission is performed on the 8 low weight data bits of the data bus.

This contention situation corresponds to the fact that the various controllers 1 transmit at the same moment on data bus D7-0 by their send-receive unit 51. Discrimination between the vectors transmitted by the various controllers so as to determine the higher priority vector, is performed in the following manner.

The winning vector of the contention is established bit after bit starting with the high weight bit.

Each controller, by contention circuit 52, validates the transmission of a bit i to the data bus only if there is equivalence between bit (i+1) that it transmits and bit DIN (i+1) present on the inner bus.

Depending on the value of the vector bit, the controller that wishes to transmit is either in a dominant state: bit at 0, or in a recessive state: bit at 1.

In the dominant state (bit at 0), signal OECONT validates output buffer 512 that belongs to send-receive circuit 51 so that it transmits a 0. The controller has necessarily won the contention on this bit but can still have equivalence with another controller. The following bit or bits will make it possible to decide between them.

In the recessive state (bit at 1), it does not validate its output buffer 512. Either all controllers 1 are in the recessive state for this bit, a return resistor 515 will impose value 1 on this bus; the controller can continue to transmit. Or at least one of the other controllers is in the dominant state (0) and will therefore win the contention; the controller can no longer continue to transmit, it has lost the contention.

The transmission of the vector is not sequenced bit by bit. During the entire duration of signal/INTA the controller validates its mechanism for transmission in contention on the 8 bits. But the round trip time on the bus will mean that the winning vector will be established only gradually, starting with the high weight bit.

The microprocessor 200 is blocked by its "READY," the time necessary for the contention. At the end of the second pulse/INTA, it will be rerouted to process the interrupt associated with the prevailing vector present on the bus. When, at the beginning of an interrupt routine, the microprocessor 200 writes ISR-NEW, the controller compares this vector with the one that has been transmitted. If they are equal, it acknowledges the corresponding source. To do this, the loading of the prevailing vector must be inhibited from the beginning of the/INTA signal until the writing of ISR-NEW. The register of prevailing vector 6 thus stores the vector that has been transmitted in contention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A programmable interrupt controller for a microprocessor interrupt system, comprising:

interrupt request register means, connected to a plurality of interrupt sources through a plurality of interrupt lines and connected to an internal bus, for storing interrupt requests from the interrupt sources;

interrupt mask register means, connected to the internal bus, for programmably masking interrupt levels;

means for storing a highest priority vector in service, connected to the internal bus;

interface means, connected to the internal bus and an external bus, for transmitting the vector stored in the means for storing a highest priority vector in service to the external bus and for simultaneously receiving a signal which is present on the external bus having a priority; and determining means, connected to the interface means, for determining if said highest priority vector in service has a higher priority than the priority of the received signal which is present on the external bus.

2. A programmable interrupt controller according to claim 1, wherein the determining means, comprises:

means for validating a transmission, by the interface means, to the external bus, of a predetermined weight bit of the highest priority vector stored in the means for storing a highest priority vector in service, only if there is equivalence between a bit, one higher in weight then the predetermined weight bit of the highest priority vector in service and a bit, one higher in weight then the predetermined weight bit, of the received signal.

3. A programmable interrupt controller according to claim 1, wherein the interface means comprises:

means for validating transmission of a bit of the highest priority vector in service to the external bus if the bit is in a dominant state and for not validating the transmission if the bit is in a recessive state.

4. A programmable interrupt controller according to claim 1, further comprising:

means for storing a plurality of interrupt vectors, connected to the internal bus, each stored interrupt vector having an interrupt priority and corresponding to one of the interrupt sources;

means for comparing, connected to the internal bus, the interrupt priorities, which are stored in said means for storing a plurality of interrupt vectors, of active and non-masked interrupt vectors with a priority of the highest priority vector in service to determine the highest priority vector and loading said means for storing a highest priority vector in service with the determined highest priority vector;

sequencer means, connected to the internal bus, for sequentially sending active and non-masked interrupts from the means for storing a plurality of interrupt vectors to the means for comparing.

5. A programmable interrupt controller according to claim 4, further comprising:

register means for storing a state of the sequencer means and storing a prevailing interrupt source; and a control logic unit means for controlling a loading of the register means for storing a state of the sequencer means.

6. A programmable interrupt controller according to claim 1, wherein the means for storing a highest priority vector in service comprises:

a register means accessible by a microprocessor, wherein when the microprocessor is executing a first interrupt routine from the programmable interrupt controller and a first interrupt vector is stored in the register means of the means for storing a highest priority vector in service, and the microprocessor is instructed to perform a higher priority interrupt routine, the microprocessor writes a higher priority interrupt vector into the register means of the means for storing a highest priority vector in service.

7. A programmable interrupt controller according to claim 6, wherein:

the register means of the means for storing a highest priority vector in service is accessible by the microprocessor such that when the microprocessor is finished executing the higher priority interrupt routine, the microprocessor writes the first interrupt vector into the register means of the means for storing a highest priority vector in service, thereby giving the programmable interrupt controller a priority of the first interrupt vector, and the microprocessor resumes processing the first interrupt routine.

8. An apparatus according to claim 1, further comprising:

means for writing an interrupt vector, corresponding to the received signal, in the means for storing a highest priority vector in service when the determining means determines that said received signal indicates a higher priority than the priority of said highest priority vector in service.

9. A programmable interrupt controller according to claim 1, wherein:

the internal bus comprises a transmitting bus and a receiving bus; and the interface means comprises:

an output buffer means, connected between the transmitting bus and the external bus, which selectively allows transmission of bits of the vector stored in the means for storing a highest priority vector in service; and an input buffer connected between the outer bus and the external bus.

10. A programmable interrupt controller according to claim 9, wherein the determining means comprises:

a comparator circuit means for each bit of the vector stored in the means for storing the highest priority in service, each of the comparator circuit means compares a bit of the highest priority vector in service with a corresponding bit of the received signal and outputs an indication of whether said bit has a higher priority than a priority of the corresponding bit of the received signal.

11. A programmable interrupt controller according to claim 10, further comprising:

a plurality of resistors, each connected to a corresponding bit line of the external bus, which places a lower priority signal on the corresponding bit line when the higher priority signal is absent from the bit line.

12. A programmable interrupt controller according to claim 1, further comprising:

a plurality of resistors, each connected to a corresponding bit line of the external bus, which places a lower priority signal on the corresponding bit line when the higher priority signal is absent from the bit line.

13. A programmable interrupt controller according to claim 1, wherein:

the external bus is a data bus.

14. A microprocessor interrupt system, comprising:

a plurality of interrupt controllers, each interrupt controller comprising:

interrupt request register means, connected to a plurality of interrupt sources through a plurality of interrupt lines, for storing interrupt requests from the interrupt sources;

interrupt mask register means, connected to the internal bus, for programmably masking interrupt levels;

means for storing a plurality of interrupt vectors, connected to the internal bus, each stored interrupt vector having an interrupt priority and corresponding to one of the interrupt sources;

means for storing a highest priority vector in service, connected to the internal bus;

means for comparing, connected to the internal bus, the priorities, which are stored in said means for storing a plurality of interrupt vectors, of active and non-masked interrupt vectors and the highest priority vector in service to determine a highest priority vector and loading said means for storing a highest priority vector in service with the determined highest priority vector;

interface means, connected to the internal bus and an external bus, for transmitting the vector stored in the means for storing a highest priority vector in service to the external bus and for simultaneously receiving a signal having a priority which is present on the external bus, said received signal being a combination of said vector transmitted by the interface means and vectors transmitted by interface means of others of said plurality of interrupt controllers; and determining means, connected to the interface means, for determining if said highest priority vector in service has a higher priority than the priority of the received signal which is present on the external bus.

15. An interrupt system according to claim 14, wherein each of said plurality of interrupt controllers has an equal control of said microprocessor interrupt system.

16. A method for processing interrupts in a microprocessor system, comprising the steps of:

receiving an interrupt request from at least one of a plurality of interrupt sources and storing the interrupt request;

storing a plurality of interrupt vectors, each interrupt vector corresponding to an interrupt source;

individually inhibiting and enabling said interrupt vectors;

systematically comparing the priorities of active and enabled vectors with the stored highest priority vector in service to determine a highest priority vector currently in service;

storing the highest priority vector currently in service as the highest priority vector in service;

transmitting the highest priority vector in service to a data bus while simultaneously receiving a signal which is on the data bus, the received signal having a priority; and determining if said highest priority vector in service has a higher priority than the priority of the received signal which is present on the data bus.

17. A method according to claim 16, further comprising the step of:

validating a transmission on the data bus of a predetermined weight bit of the highest priority vector in service when an one higher weight bit then the predetermined weight bit of the highest priority vector in service is equivalent to an one higher weight bit then the predetermined weight bit a of input data.

18. A method according to claim 16, further comprising the step:

validating the transmission of a bit of the highest priority vector in service only if the bit is in a dominant state and not validating the transmission if the bit is in a recessive state.

19. A programmable interrupt controller according to claim 16, wherein:

the external bus is a data bus.

20. A programmable interrupt controller for a microprocessor interrupt system for use with a microprocessor, comprising:

a control logic circuit unit for controlling a transmission of an interrupt request to the microprocessor and for receiving interrupt authorization from the microprocessor;

interrupt request register means, connected to a plurality of interrupt sources through a plurality of interrupt lines, for storing interrupt requests from the interrupt sources;

interrupt mask register means, connected to an internal data bus, for programmably masking interrupt levels;

means for storing a plurality of interrupt vectors, connected to the internal data bus, each stored interrupt vector defining an interrupt priority and corresponding to one of the interrupt sources;

storing means for storing a highest priority vector in service, connected to the internal data bus;

means for comparing, connected to the internal data bus, each active and non-masked interrupt vector of said stored interrupt vectors with the vector stored in the storing means for storing a highest priority vector in service in order to determine a new highest priority vector and loading said new highest priority vector in the said storing means for storing a highest priority vector; and a send/receive unit including:

interface means for receiving data present on an external bus and transmitting said data received from the external bus to the internal data bus;

contention means for comparing the data of the internal bus with the highest priority vector stored in the storing means and for determining a new highest priority vector and transmitting the new highest priority vector to the external bus via the interface means.

21. A programmable interrupt controller according to claim 20, wherein the contention means comprises:

means for validating a transmission, by the interface means, to the external data bus, of a predetermined weight bit of the highest priority vector stored in the storing means for storing a highest priority vector in service, only if there is equivalence between a bit, one higher in weight then the predetermined weight bit of the highest priority vector in service and a bit, one higher in weight then the predetermined weight bit, of input data from the internal data bus.

22. A programmable interrupt controller according to claim 20, wherein the interface means comprises:

means for validating transmission of a bit of the highest priority vector in service to the external data bus if the bit is in a dominant state and for not validating the transmission if the bit is in a recessive state.

23. A programmable interrupt controller according to claim 20, wherein the control logic unit assures the acknowledgement of said interrupt request register means validates a transmission contention of the prevailing vector by said send/receive unit, and controls a loading of the prevailing vector in the storing means for storing a highest priority vector.

24. A programmable interrupt controller according to claim 20, further comprising:

sequencer means, connected to the internal bus means, for sequentially sending active and non-masked interrupts from the means for storing a plurality of interrupt vectors to the means for comparing.

25. A programmable interrupt controller according to claim 24, further comprising:

register means for storing a state of the sequencer means and storing a prevailing interrupt source; and a control logic unit means for controlling a loading of the register means for storing a state of the sequencer means.

26. A programmable interrupt controller according to claim 20, wherein the means for storing a highest priority vector in service comprises:

a register means accessible by a microprocessor, wherein when the microprocessor is executing a first interrupt routine from the programmable interrupt controller and a first interrupt vector is stored in the register means of the means for storing a highest priority vector in service, and the microprocessor is instructed to perform a higher priority interrupt routine, the microprocessor writes a higher priority interrupt vector into the register means of the means for storing a highest priority vector in service.

27. A programmable interrupt controller according to claim 26, wherein:

the register means of the means for storing a highest priority vector in service is accessible by the microprocessor such that when the microprocessor is finished executing the higher priority interrupt routine, the microprocessor writes the first interrupt vector into the register means of the means for storing a highest priority vector in service, thereby giving the programmable interrupt controller a priority of the first interrupt vector, and the microprocessor resumes processing the first interrupt routine.

28. An apparatus according to claim 20, further comprising:

means for writing an interrupt vector, corresponding to the received signal, in the means for storing a highest priority vector in service when the contention means determines that said received data indicates a higher priority than the priority of said highest priority vector in service.

29. A programmable interrupt controller according to claim 20, wherein the interface means comprises:

an output buffer means, connected between the transmitting data bus and the external data bus means, which selectively allows transmission of bits of the vector stored in the means for storing a highest priority vector in service; and an input buffer connected between the outer bus and the internal data bus.

30. A programmable interrupt controller according to claim 29, wherein the contention means comprises:

a comparator circuit means for each bit of the vector stored in the means for storing the highest priority in service, each of the comparator circuit means compares a bit of the highest priority vector in service with a corresponding bit of the received data on the internal data bus and outputs an indication of whether said bit has a higher priority than a priority of the corresponding bit of the received data.

31. A programmable interrupt controller according to claim 30, wherein the comparator circuit means comprises a plurality of gates that each receives a bit of the prevailing vector as the corresponding bit present on the internal data bus.

32. A programmable interrupt controller according to claim 20, further comprising:

a plurality of resistors, each connected to a corresponding bit line of the external bus means, places a lower priority signal on the corresponding bit line when the higher priority signal is absent from the bit line.

33. A microprocessor interrupt system, comprising:

a plurality of interrupt controllers, each interrupt controller comprising:

a control logic circuit unit for controlling a transmission of an interrupt request to the microprocessor and for receiving interrupt authorization from the microprocessor;

interrupt request register means, connected to a plurality of interrupt sources through plurality of interrupt lines, for storing interrupt requests from the interrupt sources;

interrupt mask register means, connected to an internal data bus, for programmably masking interrupt levels;

means for storing a plurality of interrupt vectors, connected to the internal data bus, each stored interrupt vector defining an interrupt priority and corresponding to one of the interrupt sources;

storing means for storing a highest priority vector in service, connected to the internal data bus;

means for comparing, connected to the internal data bus, each active and non-masked interrupt vector of said stored interrupt vectors with the vector stored in the storing means for storing a highest priority vector in service in order to determine a new highest priority vector and loading said new highest priority vector in the said storing means for storing a highest priority vector; and a send/receive unit including:

interface means for receiving data present on an external bus and transmitting said data received from the external bus to the internal data bus;

contention means for comparing the data of the internal bus with the highest priority vector stored in the storing means and for determining a new highest priority vector and transmitting the new highest priority vector to the external bus via the interface means.

34. A method for processing interrupts in a microprocessor system, comprising the steps of:

receiving an interrupt request from at least one of a plurality of interrupt sources and storing the interrupt request;

storing a plurality of interrupt vectors, each interrupt vector corresponding to an interrupt source;

individually inhibiting and enabling said interrupt vectors;

systematically comparing the priorities of active and non-masked vectors with the stored highest priority vector in service to determine a highest priority vector currently in service;

storing the highest priority vector currently in service as the highest priority vector in service;

transmitting the highest priority vector to the external data bus by comparison between the priority vector stored in the storing means and the data of the internal data bus received from the external data bus.

35. A method according to claim 34, further comprising the step of:

validating a transmission on the data bus of a predetermined weight bit of the highest priority vector in service when an one higher weight bit then the predetermined weight bit of the highest priority vector in service is equivalent to an one higher weight bit then the predetermined weight bit a of input data.

36. A method according to claim 34, further comprising the step:

validating the transmission of a bit of the highest priority vector in service only if the bit is in a dominant state and not validating the transmission if the bit is in a recessive state.

* * * * *